UNITED STATES PATENT OFFICE.

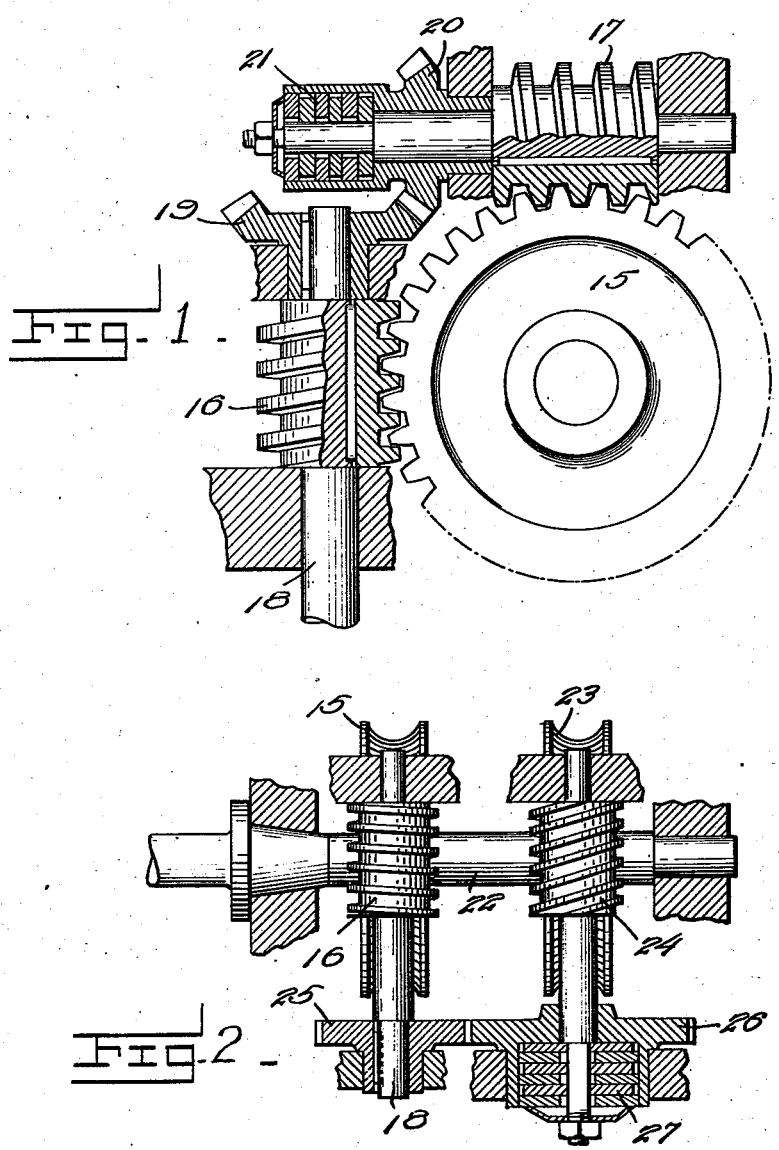

MAX MAAG, OF ZURICH, SWITZERLAND.

WORM-GEARING.

1,274,918.  Specification of Letters Patent.  Patented Aug. 6, 1918.

Application filed August 11, 1914. Serial No. 856,226.

*To all whom it may concern:*

Be it known that I, MAX MAAG, a citizen of the Republic of Switzerland, residing at Zurich, in the Canton of Zurich, Switzerland, have invented new and useful Improvements in Worm-Gearing, of which the following is a specification.

My invention relates to worm gearing, through which parts of machine-tools, dividing engines, engraving machines, or other machines requiring great accuracy, may be driven or fed, and consists in the provision of means for eliminating all back-lash, play, or lost motion between the coöperating or intermeshing elements of such gearing.

This object is accomplished by providing an auxiliary worm, driving the same, or a similar worm wheel, as the main worm, said auxiliary worm being itself frictionally driven so as to tend to move the carriage or slide at a greater speed than the main worm.

This inventive idea is illustrated in two forms in the accompanying drawing, in which, Figure 1 is a section through the preferred form of my improvement applied to the indexing mechanism of a gear-cutting machine, or the like, and Fig. 2 shows a modification of the mechanism of Fig. 1.

The principle of the invention will be clearly understood from the following description of the parts.

In Fig. 1 15 indicates a worm-wheel, for instance the index wheel of a gear cutting machine of the inter-meshing generator type, said wheel being driven by the worm 16. An absolute absence of lost motion is of the highest importance, and is obtained by the provision of a second worm 17, meshing with 15 and driven from the shaft 18 of the worm 16 through a pair of bevel gears 19, 20, the latter of which is only connected to its shaft by the friction clutch 21. Bevel gear 20 being smaller than 19, worm 17 always tends to rotate the wheel 15 somewhat faster than the worm 16. Consequently, the wheel 15 is always held firmly between the two worms without any play or lost motion and cannot make any undesirable movement under the influence of the working pressure, however directed.

When it is further desired to relieve the dividing or index wheel from mechanical work, the arrangement shown in Fig. 2 can be used. Here 15 is again said wheel of, for example, a fine dividing engine, and is driven by the main worm 16. On the shaft 22 of the wheel 15 is mounted a second worm wheel 23, driven by worm 24 which is in turn driven from shaft 18 of worm 16 through gears 25 and 26 and friction clutch 27. Here again the pitch of the two worms and the ratio of the two gears are so selected that the worm 24 tends to drive shaft 22 somewhat faster than the main worm 16.

By adjusting the capacity of yielding of the clutch 27 so that its driving power is just sufficient to rotate shaft 3, then the excess power of the friction drive, working back on the main worm and the dividing wheel, is extremely slight, and the latter has almost no load thrown on it, whereby its accuracy remains unimpaired through long periods of use.

It is to be noted that the work of rotating the worm wheel is performed by the friction drive alone, while the main drive has only to take care of the rate of movement. The main drive is, therefore, only loaded with the resistance offered by the friction clutch through which the wheel is driven, which resistance is, of course, adjustable by tightening or loosening the clutch. Owing to this fact, this drive can be very advantageously used in fine dividing machines or indexing mechanisms.

Naturally, many other uses than those indicated can be made of the principle of my invention. It is particularly useful for gear and rack drives of all kinds where absolute freedom from lost motion or back lash is required.

Having thus described my invention, what I claim is:

1. The combination with a source of power and a shaft to be driven therefrom, of a worm wheel on said shaft, a positively driven worm in mesh with said wheel, a second worm also in mesh with said wheel, and connections, including a friction clutch, between the shafts of said worms, whereby the second worm is driven faster than the first.

2. The combination with a source of power and a shaft to be driven thereby, of a worm wheel on said shaft, a positively driven worm in mesh with said wheel, a second worm also in mesh with said wheel and with its axis at right angles to that of the first worm, intermeshing bevel gears on the shafts of said worms, and an adjustable friction clutch connecting one of said worms to its shaft.

In testimony whereof I have hereunto set my hand in presence of two subscribing witnesses.

MAX MAAG.

Witnesses:
A. HEPPLI,
R. FREY.